US006987139B2

(12) United States Patent
Terada et al.

(10) Patent No.: US 6,987,139 B2
(45) Date of Patent: Jan. 17, 2006

(54) POLYMER COMPOSITION

(75) Inventors: Takahiko Terada, Kyoto (JP); Tetsuji Kawakami, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 356 days.

(21) Appl. No.: 10/272,606

(22) Filed: Oct. 16, 2002

(65) Prior Publication Data

US 2003/0078324 A1  Apr. 24, 2003

(30) Foreign Application Priority Data

Oct. 19, 2001  (JP)  ............................. 2001-321668

(51) Int. Cl.
*C08K 5/34* (2006.01)
(52) U.S. Cl. ........................ 524/91; 524/100; 524/101; 525/540
(58) Field of Classification Search ................... 524/91, 524/100, 101; 525/540
See application file for complete search history.

(56) References Cited

U.S. PATENT DOCUMENTS

| 5,684,071 | A | * | 11/1997 | Mogami et al. ............ 524/100 |
| 5,691,404 | A | * | 11/1997 | Kasowski et al. .......... 524/100 |
| 5,837,859 | A | | 11/1998 | Teoule et al. |
| 5,843,917 | A | * | 12/1998 | Boyd et al. .................... 514/50 |
| 6,206,920 | B1 | | 3/2001 | Eliaz et al. |
| 6,207,797 | B1 | | 3/2001 | Livache et al. |

FOREIGN PATENT DOCUMENTS

| EP | 1 232 758 A1 | 8/2002 |
| JP | 46-19171 | 5/1971 |
| JP | 48088136 A * | 11/1973 |
| JP | 54-13556 | 2/1979 |
| JP | 57-105438 | 6/1982 |
| JP | 08-048812 A | 2/1996 |
| KR | 2001018344 A * | 3/2001 |

OTHER PUBLICATIONS

Hiraoka et al., "Syntheses and characterization of polymers containing nucleic acid bases", *Int. J. Biolog. Macromolecules*, vol. 1, No. 2, pp. 50-54, (1979).
Spivak, et al., "Binding of Nucleotide Bases by Imprinted Polymers", *Macromolecules*, vol. 31, No. 7, pp. 2160-2165, American Chemical Society (1998).
Lewis, et al., "Biodegradable poly(L-lactic acid) matrices for the sustained delivery of antisense oligonucleotides", *Journal of Controlled Release*, vol. 37, No. 1, pp. 173-183, Elsevier Science Publishers B.V., Amsterdam, Netherlands (1995).
Hiraoka et al., "Syntheses and characterization of polymers containing nucleic acid bases", *Int. J. Biolog. Macromolecules*, vol. 1, No. 2, pp. 50-54, (1979).

* cited by examiner

*Primary Examiner*—Tae H. Yoon
(74) *Attorney, Agent, or Firm*—Akin Gump Strauss Hauer & Feld, LLP

(57) ABSTRACT

A polymer composition includes a polymer and a flame retardant. The flame retardant includes: at least one nucleic-acid-related substance that is selected from the group consisting of a nucleic acid base, a nucleoside, a nucleotide and a polynucleotide; and/or at least one derivative of the nucleic-acid-related substance. The derivative is selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide.

17 Claims, No Drawings

POLYMER COMPOSITION

BACKGROUND OF THE INVENTION

1. Field of the Invention

The present invention relates to a flame retardant that is hardly toxic and does almost no harm to the property of a polymer and also relates to a polymer composition including such a flame retardant.

2. Description of the Related Art

A polymer, as well as wood, is classified among flammables. For that reason, when a polymer should not burn in some application, the polymer cannot be used as it is, and the flammability of the polymer must be reduced in some way or other.

As used herein, the "polymers" (which will also be herein referred to as "resins" or "plastics") refer to not only thermoplastic polymers but also thermosetting polymers as well. Also, a "polymer composition" will herein refer to a mixture of a polymer and another material (such as an inorganic filler).

Generally speaking, the flammability of a polymer is minimized by adding any of various types of flame retardants to the polymer or by introducing a substituent group into the backbone of the polymer. The flame retardants are roughly classifiable into halogen-based flame retardants and non-halogen-based flame retardants.

However, it is already known that halogen-based flame retardants on fire emit harmful acidic gases of hydrogen bromide or hydrogen chloride, for example. Also, it was recently discovered that the halogen-based flame retardants burning might produce dioxin, which is seriously harmful to the creatures and environments on the earth. In view of these problems, non-halogen-based flame retardants have been researched and developed lately as alternatives to the halogen-based flame retardants.

Examples of those non-halogen-based flame retardants include metal hydroxides or phosphides. The gas emitted from a flame retardant of a metal hydroxide such as magnesium hydroxide on fire is much less toxic than that emitted from a halogen-based flame retardant. However, the metal hydroxide flame retardant is not so flame-retarding as the halogen-based flame retardant. Accordingly, to increase the inflammability of a polymer with a metal hydroxide, the metal hydroxide must be added in profusion to the polymer, thus potentially deteriorating the property of the polymer.

A flame-retarding polymer composition, in which a sulfate of a triazine compound is added to a thermoplastic polymer, is disclosed as a non-halogen-based flame retardant in Japanese Laid-Open Publication No. 8-48812. The flame-retarding effects of this composition are fair enough but are still insufficient. Thus, the development of flame retardants and flame-retarding polymer compositions having even better flame-retarding effects is awaited.

Also, from the viewpoint of global environmental protection, natural resources such as petroleum are on the verge of exhaustion and the greenhouse effect, which is partially caused by the incineration of non-materially-recyclable or non-chemically-recyclable polymers disposed, has become more and more serious. To overcome these problems, biodegradable polymers have been researched and developed increasingly actively. Among other things, biodegradable polymers, which are produced from biomass, not fossil resources such as petroleum, have been developed particularly vigorously. More specifically, botanical biomass such as corns or potatoes is the object of much attention. This is because even though these materials generate carbon dioxide when burned, the materials can also immobilize the carbon dioxide that has been emitted to the air at relatively short cycles (e.g., in one year or so). Thus, these materials may be regarded as not contributing to the greenhouse effect in the long run.

As described above, the development of flame retardants and flame-retarding polymers, which do not emit any toxic gas such as dioxin, do almost no harm to the property of polymers and yet exhibits sufficient flame-retarding effects, is awaited. Furthermore, nobody has ever developed the technique of making a flame retardant from biomass or adding biodegradability to the flame retardant itself.

SUMMARY OF THE INVENTION

In order to overcome the problems described above, preferred embodiments of the present invention provide a hardly toxic and environmentally friendly flame retardant and a polymer composition including such a flame retardant.

A polymer composition according to a preferred embodiment of the present invention preferably includes a polymer and a flame retardant. The flame retardant preferably includes: at least one nucleic-acid-related substance that is selected from the group consisting of a nucleic acid base, a nucleoside, a nucleotide and a polynucleotide; and/or at least one derivative of the nucleic-acid-related substance. The derivative is preferably selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide.

In one preferred embodiment of the present invention, thermal decomposition temperature(s) of the at least one nucleic-acid-related substance and/or the at least one derivative thereof is/are preferably higher than 100° C. but lower than a thermal decomposition temperature of the polymer. In a specific preferred embodiment of the present invention, the thermal decomposition temperature(s) of the at least one nucleic-acid-related substance and/or the at least one derivative thereof is/are preferably higher than 300° C. and lower than 550° C.

In another preferred embodiment of the present invention, the polymer composition preferably includes 5 to 150 parts by weight (more preferably, 10 to 100 parts by weight) of the at least one nucleic-acid-related substance and/or the at least one derivative thereof with respect to 100 parts by weight of the polymer.

In still another preferred embodiment, the at least one nucleic-acid-related substance preferably includes at least one compound that is selected from the group consisting of adenine, guanine, cytosine, uracil and thymine.

In yet another preferred embodiment, the at least one nucleic-acid-related substance is preferably at least one monomer that is selected from the group consisting of the nucleic acid base, the nucleoside and the nucleotide. The at least one monomer is preferably polymerized with another polymerizable component.

In this particular preferred embodiment, the another polymerizable component is preferably a monomer and the at least one monomer is preferably copolymerized with the another polymerizable component. More specifically, the another polymerizable component is preferably at least one monomer that is selected from the group consisting of a dibasic acid, a dibasic acid anhydride and a diisocyanate.

In yet another preferred embodiment, the polymer preferably includes a biodegradable polymer. More preferably, the polymer is produced from a botanical material. In a specific preferred embodiment of the present invention, the polymer is preferably a polylactic acid polymer.

In yet another preferred embodiment, the polymer composition preferably has thermoplasticity and is preferably moldable by an injection molding process.

The polymer composition according to any of preferred embodiments of the present invention can be used effectively to make various types of molded products and is preferably used as a material for a casing for electric equipment.

According to anther aspect of the invention, a use of at least one nucleic-acid-related substance and/or at least one derivative thereof as a flame retardant for a polymer composition is provided. The at least one nucleic-acid-related substance is preferably selected from the group consisting of a nucleic acid base, a nucleoside, a nucleotide and a polynucleotide. The at least one derivative is preferably selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, the compositions and properties of a polymer composition according to preferred embodiments of the present invention will be described.

A polymer composition according to a preferred embodiment of the present invention preferably includes a polymer and a flame retardant. The flame retardant preferably includes at least one nucleic-acid-related substance that is selected from the group consisting of a nucleic acid base, a nucleoside, a nucleotide and a polynucleotide. Instead of, or in addition to, the nucleic-acid-related substance, the flame retardant preferably includes at least one derivative of the nucleic-acid-related substance. The derivative may be selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide.

As will be described in further detail later by way of specific examples, the nucleic-acid-related substance and the derivative thereof each include a nitrogen atom. Accordingly, as well as a nitrogen-containing compound such as an aliphatic amine compound, an aromatic amine compound, a nitrogen-containing heterocyclic compound, a cyano compound, an aliphatic amide, an aromatic amide, urea or thiourea that has been used as a flame retardant in the prior art, the nucleic-acid-related substance and the derivative thereof have flame-retarding effects.

More particularly, the nucleic-acid-related substance and the derivative thereof have a nitrogen-containing heterocycle. Thus, it is believed that when exposed to a high temperature, the nucleic-acid-related substance and the derivative thereof, as well as the conventional nitrogen-containing heterocyclic compound flame retardant, absorb the heat and decompose, thereby minimizing the thermal decomposition of the polymer and discontinuing the supply of fuel to the flammable polymer. It is also believed that the nucleic-acid-related substance and the derivative thereof under heat create an inert atmosphere (i.e., nitrogen gas atmosphere) around the polymer, thereby reducing the contact area of the polymer with oxygen and increasing the inflammability of the polymer.

Each of the nucleic-acid-related substance and the derivative thereof is a biogenic substance and is biodegradable. Accordingly, unlike a compound to be synthesized from a fossil fuel such as petroleum, the nucleic-acid-related substance and the derivative thereof are environmentally friendly materials that are produced from biomass and have biodegradability.

It should be noted that it is not impossible for the flame retardant of the polymer composition according to preferred embodiments of the present invention to include not only the nucleic-acid-related substance and/or the derivative thereof but also the conventional flame retardant as well. However, to achieve the effects of the present invention fully, only the nucleic-acid-related substance and/or the derivative thereof with biodegradability is/are preferably used as the flame retardant.

To make the nucleic-acid-related substance and/or the derivative thereof work as a flame retardant for a polymer composition effectively, the thermal decomposition temperature thereof is preferably higher than the processing temperature (e.g., the molding temperature) of the polymer but lower than the thermal decomposition temperature of the polymer.

The polymer composition according to preferred embodiments of the present invention may be processed into any of molded products of various shapes such as sheet, film or casing depending on the property of the polymer included. It is possible to use the polymer composition not just as a molding material but also as a material for an adhesive, paint or putty. The processing temperature of a normal polymer is in the range of about 100° C. to about 300° C. Also, the temperature of a normal polymer material burning reaches somewhere between about 400° C. and about 550° C. (corresponding to the thermal decomposition temperature thereof). Thus, in preferred embodiments of the present invention, a flame retardant (i.e., the nucleic-acid-related substance and/or the derivative thereof) having a desired thermal decomposition temperature may be selectively used according to the type and/or the processing temperature of the polymer included. That is to say, any of various flame retardants having thermal decomposition temperatures that are higher than about 100° C. and lower than about 550° C. may be appropriately used depending on the intended application.

The polymer composition according to preferred embodiments of the present invention is particularly effectively applicable for use in electric equipment (including electronic appliances and electronic parts) that should be as inflammable as possible. Furthermore, the flame retardant according to preferred embodiments of the present invention can provide flame retardancy for any product without significantly decreasing the mechanical properties of the polymer.

For that reason, the flame retardant can be used effectively as a material for a bulk molded product such as a casing.

The polymer composition that may be used in any of these applications preferably includes a polymer to be processed (or molded) at a temperature of about 250° C. to about 300° C. In a typical application, the "polymer" is a conventional general-purpose engineering plastic (which herein means a plastic in a strict sense, or a thermoplastic resin). Accordingly, to prevent the flame retardant from being decomposed thermally while the polymer is being processed, the thermal decomposition temperature of the flame retardant is preferably higher than about 300° C. In view of these considerations, a flame retardant having a thermal decomposition temperature that is higher than about 300° C. and lower than about 550° C. is preferably used to achieve the effects of the present invention fully.

As used herein, the "thermal decomposition temperature" of an object is defined to be a temperature at which the weight of the object, measured by using a calorimeter (TG) at a temperature rise rate of about 10° C./min. within a nitrogen atmosphere, has decreased by 10%.

In the polymer composition according to preferred embodiments of the present invention, the mixing ratio of the polymer and the flame retardant is changeable with the specific types of the polymer and the flame retardant and the desired properties (e.g., inflammability and mechanical property) of the final product. Generally speaking, the polymer composition preferably includes 5 to 150 parts by weight of the flame retardant (i.e., the nucleic-acid-related substance and/or the derivative thereof) with respect to 100 parts by weight of the polymer. The flame retardant according to preferred embodiments of the present invention is typically in a powder form, and has a small tap density and exhibits great volume effects (or surface area effects) for its weight. Accordingly, the flame retardant may exhibit the expected flame-retarding effects even in a relatively small amount. However, to achieve the flame-retarding effects just as intended, the flame retardant is preferably mixed in at least 5 parts by weight, more preferably in 10 parts by weight or more. Nevertheless, if the mixing ratio of the flame retardant exceeds 150 parts by weight, then the property (e.g., mechanical property) of the polymer might deteriorate excessively. For that reason, to minimize the unwanted degradation in the polymer property when the polymer composition is applied to a bulk molded product, for example, the mixing ratio of the flame retardant is preferably at most 100 parts by weight, more preferably 50 parts by weight or less.

Hereinafter, specific nucleic-acid-related substances and the derivatives thereof to be preferably used as the flame retardant for the polymer composition of the present invention will be described.

As is well known in the art, a nucleic acid base is a substance that forms a nucleic acid when combined with pentose and phosphoric acid. Examples of preferred nucleic acid bases include adenine, guanine, cytosine, uracil, thymine, and hypoxanthine. Alternatively, sulfates, nitrates, borates, hydrochlorides and isocyanurates of these nucleic acid bases may also be used effectively. For example, adenine sulfates, guanine hydrochlorides and guanine sulfates may be used.

Examples of preferred nucleosides include adenosine, guanosine, cytidine, uridine, thymidine and inosine.

Examples of preferred nucleotides include adenylic acid, guanylic acid, cytidylic acid, uridylic acid, thymidylic acid and inosinic acid. Examples of preferred metal salts of the nucleotides include 5'-sodium adenylates, sodium adenosine triphosphates, 5'-sodium guanylates, 5'-sodium uridylates and 5'-sodium inosinates.

A compound, obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide, also has flame-retarding effects. Examples of such compounds include 2-methyl adenine, 6-diethyl adenine and 6-allyl adenine.

Examples of preferred alkyl groups having 1 to 4 carbon atoms include methyl groups, ethyl groups, propyl groups and butyl groups. Examples of preferred aryl groups having 6 to 10 carbon atoms include phenyl groups, tolyl groups, xylyl groups and naphthyl groups. Examples of preferred alkoxy groups include methoxy groups, ethoxy groups and butoxy groups. It should be noted that if the number of carbon atoms is too large, then the flame-retarding effects might decrease.

As described above, the flame retardant to be included in a polymer composition for a bulk molded product, in particular, preferably has a thermal decomposition temperature that is higher than about 300° C. and lower than about 550° C. Examples of such compounds include adenine, guanine, cytosine, uracil and thymine. The thermal decomposition temperatures of typical nucleic-acid-related substances to be preferably used as the flame retardants of the present invention are shown in the following Table 1:

TABLE 1

| Nucleic-acid-related Substance | Thermal decomposition Temperature (° C.) |
|---|---|
| Adenine | 365 |
| Guanine | 365 |
| Cytosine | 325 |
| Uracil | 335 |
| Thymine | 337 |
| Inosine | 219 |
| Guanylic acid | 180 |
| Adenylic acid | 178 |
| Hypoxanthine | 150 |

It should be noted that the "thermal decomposition temperature" was herein supposed to be a temperature at which the weight of the object (measured by using a thermal analyzer TAS 100 (TG/DTA•DSC produced by Rigaku Corporation) at a temperature rise rate of about 10° C./min. within a nitrogen atmosphere) decreased by 10%.

The compound, in which an atomic group selected from the group consisting of an alkyl group having 1 to 4 carbon atoms, an aryl group having 6 to 10 carbon atoms, an alkoxy group and a mercapto group is substituted for a hydrogen atom that is bonded to a nitrogen atom of a nucleotide or nucleoside, has phosphoric acid as its constituent unit. The present inventors believe that each of those compounds exhibits the flame-retarding effects by producing a polyphosphoric acid compound and forming a heat resistant film when exposed to an elevated temperature and/or through a carbonization accelerating mechanism of solid acid. Accordingly, each of these compounds exhibits both the flame-retarding effects caused by the phosphoric acid and those caused by the nitrogen-containing heterocycle, and is expected to be a stronger flame retardant. It should be noted that a polynucleotide may also be used as a flame retardant according to a preferred embodiment of the present invention because polynucleotide is almost as flame retarding as nucleotide. However, the polynucleotide preferably has a molecular weight on the order of several tens of thousands or less. This is because a polynucleotide with an excessive molecular weight would not be dispersed into the polymer sufficiently.

The polymers to be included in the polymer compositions according to preferred embodiments of the present invention may be general-purpose polymers including: thermoplastic resins such as polystyrene, ABS resin, polyamide resin, polypropylene, polyurethane and PPS resin; and thermosetting resins such as epoxy resin, phenol resin and polyester resin. However, biodegradable polymers are preferred to those general-purpose polymers. When the flame retardant according to preferred embodiments of the present invention is combined with a biodegradable polymer, a polymer composition with good biodegradability can be obtained. Accordingly, such a polymer composition may be disposed of by getting decomposed by enzyme and/or microorganism. In addition, even if buried in the ground, the polymer composition can also be decomposed and incorporated into Nature's substance recycling.

Examples of preferred biodegradable polymers include: a polymer obtained by ring-opening polymerization of lactone (e.g., polycaprolactone or polypropiolactone); a polymer of a hydroxy acid (e.g., polylactic acid or polyglycolic acid); a copolymer of a glycol and an aliphatic dicarboxylic acid (e.g., polyethylene adipate, polybutylene adipate, polytetramethylene adipate, polyethylene succinate or polybutylene succinate); a polymer having a functional terminal group (e.g., polycaprolactone diol or polycaprolactone triol); and a polyester obtained by fermenting microorganism (e.g., 3-hydroxy propionate, 3-hydroxybutyrate, 3-hydroxyvalerate or 3-hydroxy octanoate).

Among various biodegradable polymers, polymers produced from botanical biomass, which immobilize carbon dioxide in the air at relatively short cycles (e.g., one year or so), are particularly preferable. These polymers do not need fossil resources and can immobilize carbon dioxide, which the polymers themselves generated when burned, at short cycles. Accordingly, these polymers do not contribute to the greenhouse effect in the long run. Such polymers are made from starch that is the main ingredient of corn or sweet potato, cellulose that is the main ingredient of vegetation or rice straws, or glucose or other sugars that are constituents of starch or cellulose. For example, polylactic acid or cellulose acetate may be used as such a polymer.

The flame retardant according to preferred embodiments of the present invention is typically in the powder form and dispersed and mixed into the polymer as described above. Alternatively, the flame retardant may also be introduced into the polymer chain. For example, when at least one nucleic-acid-related substance that is selected from the group consisting of a nucleic acid base, a nucleoside and a nucleotide is used as the flame retardant of the present invention, the nucleic-acid-related substance may be used as a sort of monomer (i.e., polymerizable component) and polymerized with another polymerizable component. The amino group and/or the hydroxide group of the nucleic acid base, nucleoside or nucleotide are/is used as functional group(s) for the polymerization reaction. The polymer to be obtained by the polymerization reaction may either be a linear polymer or have a three-dimensional cross-linking structure.

Examples of the at least one monomer that is selected from the group consisting of the nucleic acid base, nucleoside and nucleotide include adenine, adenosine, adenylic acid, guanine, guanosine, guanylic acid, cytosine, cytidine, cytidylic acid, uracil, uridine, uridylic acid, thymine, thymidine, thymidylic acid, hypoxanthine, inosine and inosinic acid.

If at least one monomer of this group is copolymerized with another polymerizable component that is selected from the group consisting of: dibasic acids such as phthalic acid, fumaric acid, maleic acid and succinic acid; dibasic acid anhydrides such as phthalic acid anhydride, fumaric acid anhydride, maleic acid anhydride and succinic acid anhydride; and diisocyanates such as 2,4-toluene diisocyanate, 2,6-toluene diisocyanate, diphenylmethane-4,4'-diisocyanate and hexamethylene diisocyanate, then a linear polymer exhibiting flame-retarding effects can be obtained.

When exposed to an elevated temperature, even a polymer including the flame retardant as its polymerizable component in this manner also absorbs and dissipates the heat and forms an inert atmosphere due to the reaction of the nitrogen-containing heterocycle included in its polymer backbone. Thus, such a polymer also exhibits the desired flame-retarding effects. Even when the flame retardant is introduces into the polymer chain, the weight ratio of the flame retardant to the polymer is also preferably 5 to 150 parts by weight, more preferably 10 to 100 parts by weight as described above. Optionally, another flame retardant may be dispersed and mixed into a polymer that already includes a flame retardant as its polymerizable component. Even so, the overall weight ratio of the flame retardants preferably falls within the above-specified ranges.

It should be noted that the polymer composition according to preferred embodiments of the present invention may include not only the polymer and the flame retardant (i.e., the nucleic-acid-related substance and/or the derivative thereof) as its base materials but also any known additive(s) if necessary and unless the effects of the present invention are lessened.

Examples of those additives include: antioxidants such as phenols, phosphites and thioethers; light stabilizers such as benzophenones, salicylates, benzotriazoles and hindered amines; metal inactivating agents; halogen scavengers; lubricating agents such as olefins, aliphatic acids and derivatives thereof; nucleating agents such as metal salts, talcs and sorbitols; fillers such as talc, calcium carbonate, barium sulfate, glass fiber and mica; anti-blooming agents; anti-blocking agents; defogging agents; tackiness agents; coloring agents; flatting agents; antistatic agents; oxygen or carbon dioxide absorbing agents; gas adsorbing agents; freshness keeping agents; enzymes; deodorizing agents; and perfumes.

The polymer composition according to preferred embodiments of the present invention is obtained by blending, mixing, melting and kneading its material components. The order of blending the respective components and the method of kneading them are not particularly limited. These components may be kneaded by a normal method using a kneader, mixing roll, tumbler-type blender, V-blender, Henschel mixer or ribbon mixer. The method of melting and kneading is not particularly limited, either. The melting and kneading process may be carried out at a temperature that is equal to or higher than the melting point of the given thermoplastic resin by using a screw extruder, heating kneader, Banbury mixer or heating mixing roll, for example. The melting and kneading process may also be carried out within an inert gas such as nitrogen gas.

The polymer composition according to preferred embodiments of the present invention can be used effectively in any of various bulk molded products that should have sufficient inflammability. Examples of such molded products include:

parts and casings for various types of consumer electric products such as washing machines, refrigerators, tableware drying machines, rice cookers, electric fans, ventilators, TVs, personal computers, stereos, phones, microwave ovens, heated toilet seats and irons; parts and casings for heating and lighting equipment including air conditioners, stoves, cooking stoves, fan heaters and hot-water suppliers; interior and exterior materials for buildings; and parts or interior materials for cars, ships and airplanes.

EXAMPLES

Hereinafter, specific examples of preferred embodiments of the present invention and comparative examples will be described. Five polymer composition samples representing Examples Nos. 1 through 5 of the present invention were prepared by dispersing flame retardants according to preferred embodiments of the present invention in a polymer. Seven more polymer composition samples representing Comparative Examples Nos. 1 through 7 were also prepared by dispersing conventional flame retardants in a polymer. To obtain these twelve samples, the polymer and the flame retardant were blended at the ratio shown in the following Table 2 or 3, and then the blend was heated to, and melted and mixed at, a temperature that was equal to or higher than the melting point of the polymer.

Each of the resultant polymer compositions was compacted at a pressure of about 4.9 MPa to obtain a strip-shaped specimen having approximate dimensions of 12.7 mm×3 mm×127 mm for use in flammability tests.

The flammability tests were carried out on the specimens in compliance with the Safety Standard UL 94 entitled "Test for Flammability of Plastic Materials for Parts in Devices and Appliances". Specifically, the flammability tests included horizontal burning tests 94HB (reference standard: ASTM-D635) and 20 mm vertical burning tests 94V (reference standard: ASTM-D3801).

In the 94HB tests, if the burning rate of a specimen as measured for a length of 75 mm was no greater than 40 mm per minute or if the specimen stopped burning before the mark indicating the end of the 75 mm length was reached, then the specimen was classified 94HB (which will be simply referred to as "HB" in Tables 3 and 6).

In the 94V tests, if the total flaming combustion duration of each of the five specimens was 10 seconds or less; or if the overall flaming combustion duration of the five specimens was 50 seconds or less; or if the flaming and glowing combustion duration of each of the five specimens after the second burner application was 30 seconds or less, then the specimens were classified 94V-0 (which will be simply referred to as "V-0" in Tables 2, 3, 5 and 6).

TABLE 2

| Example No. | Polymer: Parts by weight | Flame retardant: Parts by weight | Flammability 1/8 inch | Flammability 1/16 inch |
|---|---|---|---|---|
| 1 | Polystyrene: 100 phr | Adenine: 10 phr | V-0 | V-0 |
| 2 | Polystyrene: 100 phr | Adenine: 20 phr | V-0 | V-0 |
| 3 | Polystyrene: 100 phr | Adenine: 50 phr | V-0 | V-0 |
| 4 | Polystyrene: 100 phr | Adenine: 100 phr | V-0 | V-0 |
| 5 | High-impact Polystyrene: 100 phr | Cytosine: 30 phr | V-0 | V-0 |

TABLE 3

| Comp. Example No. | Polymer: Parts by weight | Flame retardant: Parts by weight | Flammability 1/8 inch | Flammability 1/16 inch |
|---|---|---|---|---|
| 1 | Polystyrene: 100 phr | Ethylenediamine Phosphate: 30 phr | HB | HB |
| 2 | Polystyrene: 100 phr | Magnesium Hydroxide: 30 phr | HB | HB |
| 3 | Polystyrene: 100 phr | Tetrazole Ammonium salt: 30 phr | HB | HB |
| 4 | Polystyrene: 100 phr | Melamine: 100 phr | HB | HB |
| 5 | Polystyrene: 100 phr | Melamine Isocyanurate: 30 phr | HB | HB |
| 6 | Polystyrene: 100 phr | Tetrabromo-bisphenol A: 30 phr | V-0 | V-0 |
| 7 | Polystyrene: 100 phr | Triphenyl Phosphate: 30 phr | HB | HB |

As can be seen from the results shown in Table 2, just by blending 10 parts by weight of adenine with 100 parts by weight of polystyrene, the polymer composition could be classified V-0. As for the comparative examples shown in Table 3 on the other hand, only the composition representing Comparative Example No. 6, which included tetrabromo-bisphenol A as a halogen-based flame retardant, was classified V-0 but the other compositions were all rated as HB.

Thus, it can be seen that the nucleic-acid-related substance exhibits excellent flame-retarding effects. Furthermore, the flame retardants according to preferred embodiments of the present invention are biogenic compounds, and therefore do not contribute to the exhaustion of valued petroleum resources, which is one of the major environmental problems to solve.

The mechanical properties of the polymer compositions representing Examples Nos. 1 through 5 were further evaluated. Specimens were prepared by making pellets of the respective polymer compositions through an injection molding process. The standard conditions for the molding process included a die temperature of about 60° C., an injection pressure of about 80 MPa, an injection time of about 10 seconds (with a cooling time of about 40 seconds) and an injection rate of about 40 mm/s, all of which were appropriately adjusted according to the specific materials used. Dumbbell specimens and flat-plate specimens were also prepared by an injection molding process and were subjected to a tensile test (ASTM-D638), a bending test (ASTM-D790) and an Izod impact test (ASTM-D256). The tensile and bending tests were carried out with an autograph AG-50KEN produced by Shimadzu Corp. The Izod impact test (with a notch) was carried out with an Izod impact tester produced by Toyo Seiki Seisaku-sho, Ltd.

The results of evaluation on the respective specimens representing Examples Nos. 1 through 5 are shown in the following Table 4. Similar tests were also carried out on two more specimens: polystyrene including a conventional halogen-based flame retardant in 20 parts by weight (Comparative Example No. 8); and high-impact polystyrene including a halogen-based flame retardant in 20 parts by weight (Comparative Example No. 9). The results are also shown in the following Table 4:

TABLE 4

| Sample | Tensile Strength (MPa) | Flexural Strength (MPa) | Izod impact strength (kJ/m$^2$) |
| --- | --- | --- | --- |
| Example 1 | 19.5 | 33.0 | 6.0 |
| Example 2 | 20.3 | 33.7 | 5.5 |
| Example 3 | 18.7 | 31.9 | 5.6 |
| Example 4 | 17.3 | 31.2 | 4.8 |
| Example 5 | 23.2 | 38.3 | 9.9 |
| Comp. Ex. 8 | 20.6 | 33.3 | 6.2 |
| Comp. Ex. 9 | 24.1 | 39.5 | 10.3 |

As can be seen from the results shown in Table 4, the mechanical properties of the sample representing Example No. 4, to which adenine was added in 100 parts by weight, were slightly inferior to those of Comparative Example No. 8 to which the conventional flame retardant was added in 20 parts by weight, but were still acceptable ones in practice. Thus, the flame retardant according to preferred embodiments of the present invention does not degrade the mechanical properties of a polymer so seriously, and is effectively applicable for use in a polymer composition for a bulk molded product.

Six more specimens were further prepared by a similar method for the polymer compositions representing Examples Nos. 6 through 11 shown in the following Table 5. The flammability of those specimens was also rated in the same way. In this case, however, as for each of the samples including a thermosetting resin (i.e., epoxy resin, phenol resin or unsaturated polyester resin), the resin was mixed with a flame retardant in a prepreg state and then the mixture was heated and cured to obtain a specimen.

TABLE 5

| | | | Flammability | |
| --- | --- | --- | --- | --- |
| Example No. | Polymer: Parts by weight | Flame retardant: Parts by weight | ⅛ inch | ¹⁄₁₆ inch |
| 6 | Epoxy resin: 100 phr | Adenylic acid: 30 phr | V-0 | V-0 |
| 7 | Phenol resin: 100 phr | Inosine: 20 phr | V-0 | V-0 |
| 8 | Unsaturated Polyester: 100 phr | Guanylic acid: 150 phr | V-0 | V-0 |
| 9 | Polylactic acid: 100 phr | Adenine: 20 phr | V-0 | V-0 |
| 10 | Polyhydroxy-Alkanoate: 100 phr | Uracil: 100 phr | V-0 | V-0 |
| 11 | Ethyl Cellulose: 100 phr | Adenine: 20 phr | V-0 | V-0 |

As can be seen from the results shown in Table 6, each of the samples representing these Examples Nos. 6 through 11 was classified V-0 and exhibited excellent flame-retarding effects.

Among other things, the polymers of Examples Nos. 9 through 11 are botanical polymers and have biodegradability. Accordingly, each of the polymer compositions representing Examples Nos. 9 through 11 is entirely made of biogenic materials and is an environmentally friendly material that does not contribute to the greenhouse effect in the long run even when burned.

As can be seen from the specific examples described above, the nucleic-acid-related substance and the derivative thereof can exhibit excellent flame-retarding effects thanks to the reaction of the nitrogen-containing heterocycle included in its molecule, and yet degrade the mechanical properties of the polymer only slightly. Thus, the nucleic-acid-related substance and the derivative thereof are effectively applicable for use in a bulk molded product. It should be noted, however, that these effects are achievable not just by the nucleic-acid-related substances as described specifically for the examples of the present invention but also by other nucleic-acid-related substances such as thymine, adenylic acid and hypoxanthine as well.

Next, polymer compositions (or copolymers) representing Examples Nos. 12 through 18 of the present invention, obtained by polymerizing the flame retardants according to preferred embodiments of the present invention with the polymers, will be described.

The polymer compositions (or copolymers) representing Examples Nos. 12 through 18 were prepared by subjecting the copolymerizable components shown in the following Table 6 to an equimolar reaction.

TABLE 6

| | Polymer | Flame retardant | Flammability | |
| --- | --- | --- | --- | --- |
| Example No. | Copolymerizable Component | Copolymerizable Component | ⅛ inch | ¹⁄₁₆ inch |
| 12 | Succinic acid | Adenine | HB | HB |
| 13 | Diphenylmethane Diisocyanate | Adenosine | HB | HB |
| 14 | Succinic acid | Adenosine | HB | HB |
| 15 | Bisphenol A Epoxy | Guanine | HB | HB |
| 16 | Hexamethylene Diisocyanate | Adenosine | HB | HB |
| 17 | Succinic acid | Cytosine | V-0 | V-0 |
| 18 | Adipic acid | Inosine | HB | HB |

These components were copolymerized under the following specific conditions:

Example No. 12

5.35 g of adenine and 3.2 g of sodium hydroxide were added to 100 ml of water to obtain Solution No. 1. Meanwhile, 6.27 g of succinic acid chloride was dissolved in 100 ml of chloroform to obtain Solution No. 2. Then, Solution No. 2 was added at a time to Solution No. 1 through a dropping while Solution No. 1 was being stirred up strongly. As a result, a fine powder polymer precipitated immediately. Next, the polymer was filtered, washed with water and then methanol sufficiently, and dried at 60° C. within a reduced pressure atmosphere, thereby obtaining the sample representing Example No. 12.

The infrared absorption of the resultant polymer composition was analyzed by a KBr pressed-disk technique. As a result, absorption by an amide bond was identified. Also, TG-DSC of this sample revealed that its weight decreased by 25% or less at 500° C. Thus, this polymer was found to be a polymer composition with excellent heat resistance and inflammability.

Example No. 13

A mixture of 26.7 g of adenosine and 25.0 g of diphenylmethane diisocyanate (MDI) was heated to 60° C. and stirred up continuously to produce the polymer composition representing Example No. 13.

Example No. 14

205.7 g of adenosine and 53.1 g of succinic acid were put into a three-necked flask with a distillation tower. The reacted mixture was stirred up well and kept at 200° C. while the water produced was vaporized by distillation. This state was maintained for approximately one hour until most of the water was removed and until the reaction was substantially complete (i.e., until the reacted mixture became transparent). In this manner, the polymer composition representing Example No. 14 was obtained.

Example No. 15

Bisphenol epoxy and guanine were mixed in powders. The mixture was put into, and compressed by, a die, where the mixture was heated to a temperature (e.g., 200° C.) that was equal to or higher than the softening point of epoxy and then retained at the temperature for about 30 minutes. In this manner, the thermosetting polymer composition representing Example No. 15 was obtained.

Example No. 16

A mixture of 26.7 g of adenylic acid and 16.8 g of hexamethylene diisocyanate (HDI) was heated to 60° C. and stirred up continuously to produce the polymer composition representing Example No. 16.

Example No. 17

85.47 g of cytosine and 53.1 g of succinic acid were put into a three-necked flask with a distillation tower. The reacted mixture was stirred up well and kept at 200° C. while the water produced was vaporized by distillation. This state was maintained for approximately one hour until most of the water was removed and until the reaction was substantially complete (i.e., until the reacted mixture became transparent). In this manner, the polymer composition representing Example No. 17 was obtained.

Example 18

5.67 g of adipic acid chloride and 8.34 g of inosine were put into a polymerization reaction tube with nitrogen supplied through a nitrogen-introducing capillary thereof. Ten minutes later, the reacted mixture was heated to 190° C. Then, this state was maintained for approximately one hour to obtain the polymer composition representing Example No. 18.

The polymer compositions (or copolymers) representing Examples Nos. 12 through 18 were subjected to similar flammability tests. As a result, each of the polymer compositions was rated as HB or V-0 as shown in Table 6. Each of the polymer compositions representing Examples Nos. 12 through 18 is a biodegradable polymer composition and an environmentally friendly material. Among other things, succinic acid can be synthesized from glucose by a bioprocess. Accordingly, each of the polymer compositions representing Examples Nos. 12, 14 and 17 is entirely made of biogenic materials and is even more environmentally friendly.

Various preferred embodiments of the present invention described above provide a flame retardant which is hardly toxic and contributes to neither exhaustion of valued natural resources nor the greenhouse effect, and also provide a polymer composition including such a flame retardant.

A polymer composition according to any of various preferred embodiments of the present invention described above is moldable by a transfer molding, compaction or injection molding process.

Furthermore, a polymer composition according to any of various preferred embodiments of the present invention has excellent mechanical properties, and can be used effectively in numerous fields of application including: bodies or parts of household commodities such as furniture or other general goods, building materials, construction materials and transportation equipment; housing equipment; electric equipment; decorative laminated sheets; and decorations.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A polymer composition comprising a polymer and a flame retardant,
   wherein the flame retardant includes:
   at least one nucleic-acid-related substance that is selected from the group consisting of a nucleic acid base, a nucleoside, a nucleotide and a polynucleotide; and/or
   at least one derivative of the nucleic-acid-related substance,
   the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
   wherein the at least one nucleic-acid-related substance is at least one monomer that is selected from the group consisting of the nucleic acid base, the nucleoside and the nucleotide, the at least one monomer being polymerized with another polymerizable component.

2. The polymer composition of claim 1, wherein thermal decomposition temperature(s) of the at least one nucleic-acid-related substance and/or the at least one derivative thereof is/are higher than 100° C. but lower than a thermal decomposition temperature of the polymer.

3. The polymer composition of claim 1, wherein the thermal decomposition temperature(s) of the at least one nucleic-acid-related substance and/or the at least one derivative thereof is/are higher than 300° C. and lower than 550° C.

4. The polymer composition of claim 1, wherein the polymer composition comprises 5 to 150 parts by weight of the at least one nucleic-acid-related substance and/or the at least one derivative thereof with respect to 100 parts by weight of the polymer.

5. The polymer composition of claim 1, wherein the another polymerizable component is a monomer and the at least one monomer is copolymerized with the another polymerizable component.

6. The polymer composition of claim 5, wherein the another polymerizable component is at least one monomer that is selected from the group consisting of a dibasic acid, a dibasic acid anhydride and a diisocyanate.

7. The polymer composition of claim 6, wherein the polymer is a polylactic acid polymer.

8. The polymer composition of claim 1, wherein the polymer composition has thermoplasticity and is moldable by an injection molding process.

9. A molded product made of a polymer composition comprising a polymer and a flame retardant,
wherein the flame retardant includes:
at least one nucleic-acid-related substance that is selected from the group consisting of a nucleic acid base, a nucleoside, a nucleotide and a polynucleotide; and/or
at least one derivative of the nucleic-acid-related substance,
the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
wherein the at least one nucleic-acid-related substance is at least one monomer that is selected from the group consisting of the nucleic acid base, the nucleoside and the nucleotide, the at least one monomer being polymerized with another polymerizable component.

10. A casing for electric equipment, wherein the casing is made of a polymer composition comprising a polymer and a flame retardant,
wherein the flame retardant includes:
at least one nucleic-acid-related substance that is selected from the group consisting of a nucleic acid base, a nucleoside, a nucleotide and a polynucleotide; and/or
at least one derivative of the nucleic-acid-related substance,
the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
wherein the at least one nucleic-acid-related substance is at least one monomer that is selected from the group consisting of the nucleic acid base, the nucleoside and the nucleotide, the at least one monomer being polymerized with another polymerizable component.

11. A method of imparting flame retardance to a polymer comprising mixing at least one nucleic-acid-related substance and/or at least one derivative of the nucleic acid-related substance with the polymer,
the at least one nucleic-acid-related substance being selected from the group consisting of a nucleic acid base, a nucleoside, a nucleotide and a polynucleotide,
the at least one derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
wherein the at least one nucleic-acid-related substance is at least one monomer that is selected from the group consisting of the nucleic acid base, the nucleoside and the nucleotide, the at least one monomer being polymerized with another polymerizable component.

12. A polymer composition comprising a polymer and a flame retardant,
wherein the polymer comprises a biodegradable polymer; and wherein the flame retardant includes:
at least one nucleic-acid-related substance that is selected from the group consisting of a nucleic acid base, a nucleoside, a nucleotide and a polynucleotide; and/or
at least one derivative of the nucleic-acid-related substance,
the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
wherein the at least one nucleic-acid-related substance is at least one monomer that is selected from the group consisting of the nucleic acid base, the nucleoside and the nucleotide, the at least one monomer being polymerized with another polymerizable component.

13. The polymer composition of claim 12, wherein the polymer composition comprises 5 to 150 parts by weight of the at least one nucleic-acid-related substance and/or the at least one derivative thereof with respect to 100 parts by weight of the polymer.

14. The polymer composition of claim 12, wherein the at least one nucleic-acid-related substance includes at least one compound that is selected from the group consisting of adenine, guanine, cytosine, uracil, and thymine.

15. A polymer composition comprising a polymer and a flame retardant,
wherein the polymer is produced from a botanical material;
and wherein the flame retardant includes:
at least one nucleic-acid-related substance that is selected from the group consisting of a nucleic acid base, a nucleoside, a nucleotide and a polynucleotide; and/or
at least one derivative of the nucleic-acid-related substance,
the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;
wherein the at least one nucleic-acid-related substance is at least one monomer that is selected from the group consisting of the nucleic acid base, the nucleoside and the nucleotide, the at least one monomer being polymerized with another polymerizable component.

16. The polymer composition of claim 15, wherein the polymer composition comprises 5 to 150 parts by weight of the at least one nucleic-acid-related substance and/or the at least one derivative thereof with respect to 100 parts by weight of the polymer.

17. A polymer composition comprising a polymer and a flame retardant, wherein the polymer is produced from a botanical material;

and wherein the flame retardant includes:

at least one nucleic-acid-related substance that is selected from the group consisting of a nucleic acid base, a nucleoside, a nucleotide and a polynucleotide; and/or at least one derivative of the nucleic-acid-related substance, the derivative being selected from the group consisting of: (a) a sulfate, a nitrate, a borate, a hydrochloride or an isocyanurate of the nucleic acid base; (b) a metal salt of the nucleotide; and (c) a compound obtained by substituting an alkyl group having 1 to 4 carbon atoms, an aryl group having 6 to 10 carbon atoms, an alkoxy group or a mercapto group for a hydrogen atom that is bonded to a nitrogen atom of the nucleic acid base, the nucleoside or the nucleotide;

wherein the at least one nucleic-acid-related substance includes at least one compound that is selected from the group consisting of adenine, guanine, cytosine, uracil, and thymine.

* * * * *